June 2, 1964   I. JEPSON ET AL   3,135,189
COOKING VESSEL
Filed June 14, 1961   4 Sheets-Sheet 3

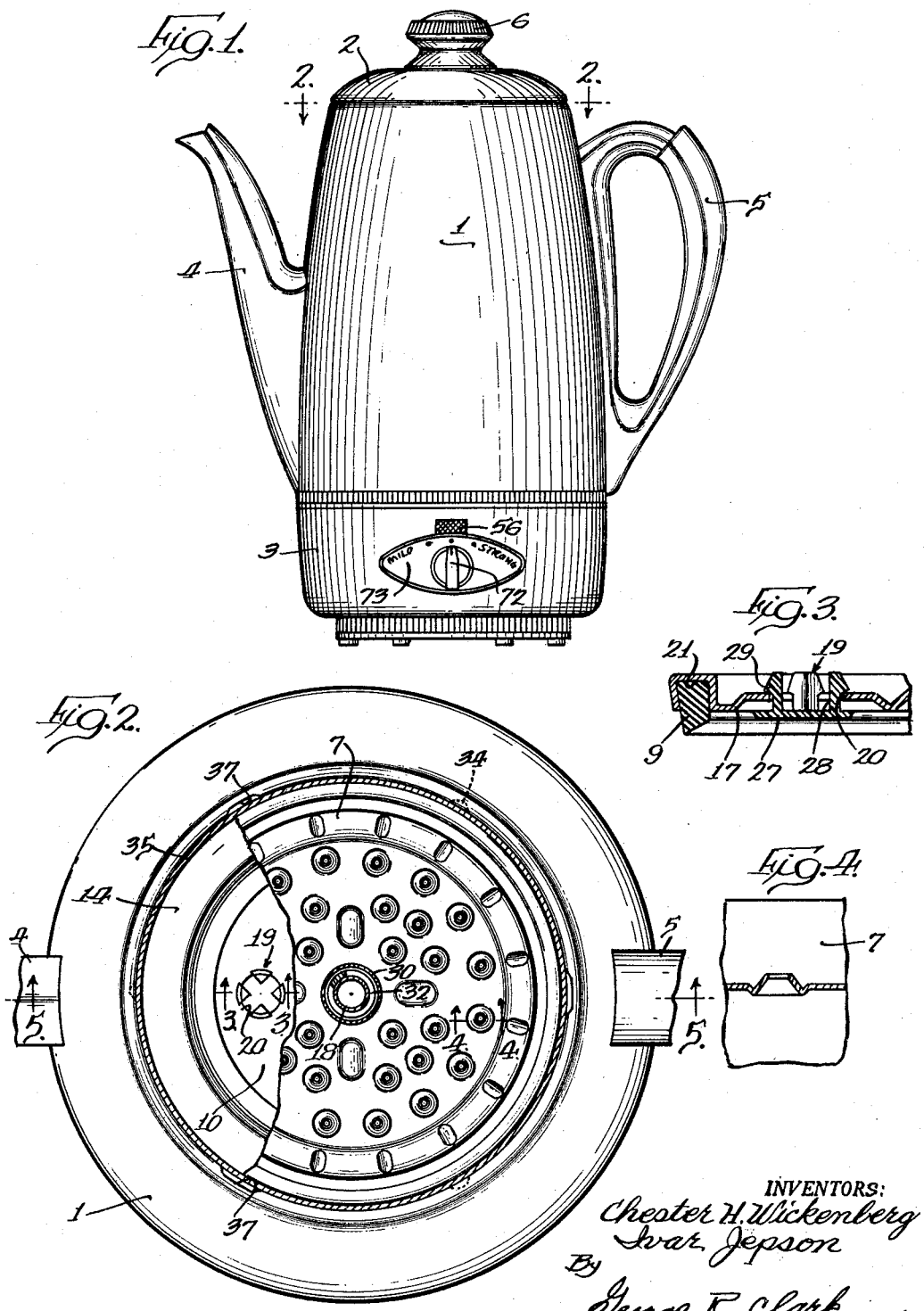

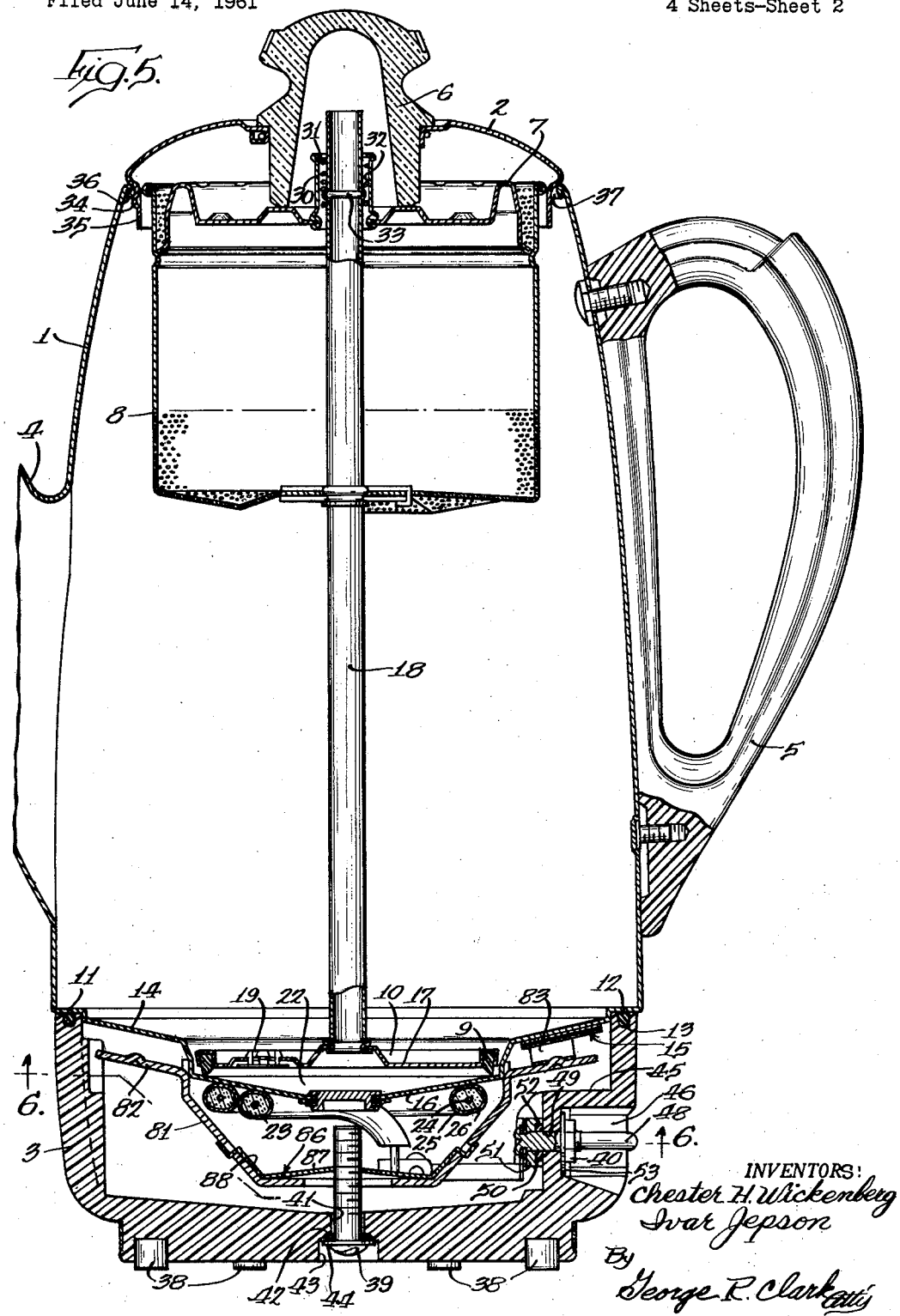

INVENTORS:
Chester H. Wickenberg
Ivar Jepson
By George R. Clark Atty

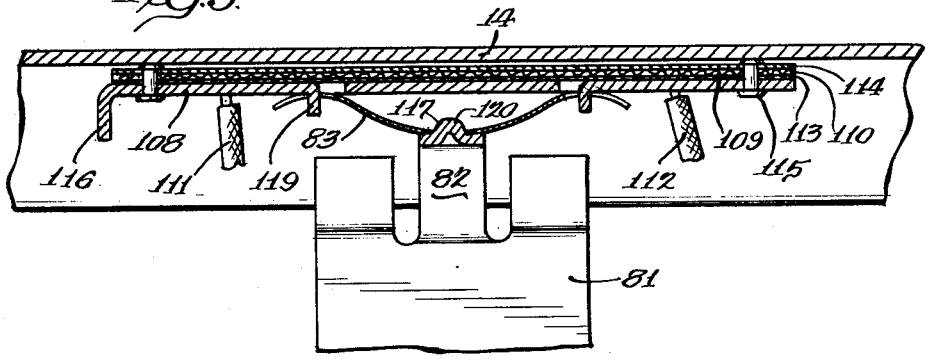
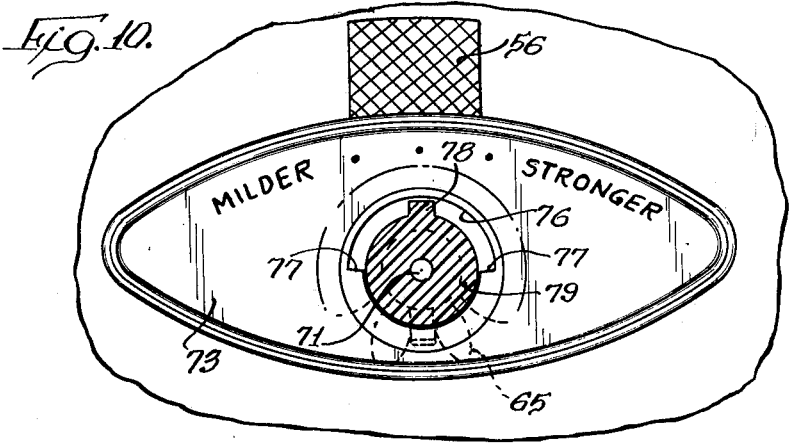
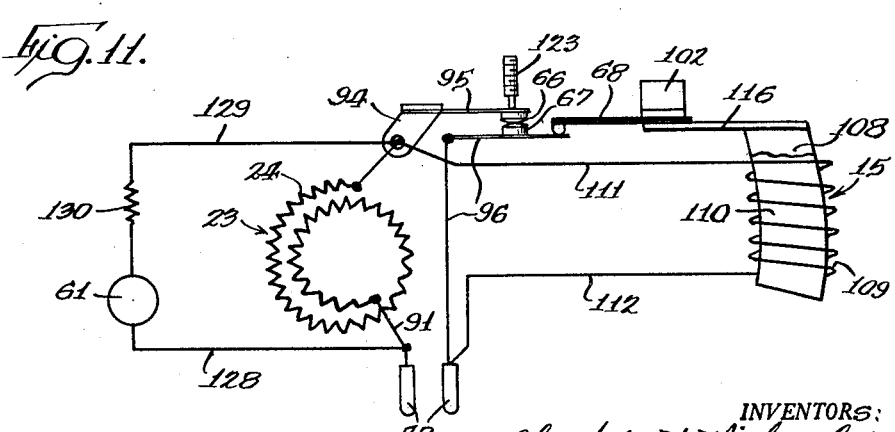

3,135,189
COOKING VESSEL
Ivar Jepson, Oak Park, and Chester H. Wickenberg, Elgin, Ill., assignors to Sunbeam Corporation, Chicago, Ill., a corporation of Illinois
Filed June 14, 1961, Ser. No. 117,078
24 Claims. (Cl. 99—281)

This invention relates to cooking vessels for preparing foods. The invention will be illustrated in connection with an improved coffee percolator. However, the invention is also applicable to other types of food cooking vessels.

Some prior art forms of coffee percolators have several disadvantages or limitations. For instance, they are noisy and slow in starting to percolate. They are noisy and slow because of the percolator pump they use. The percolator pump may comprise a pump chamber which is defined by a movable element which rests on the coffee urn bottom or in a pump well formed in the bottom. This movable element has a hollow stem through which the water is perked into a coffee basket mounted on the stem. When the liquid in the pump chamber is heated sufficiently to be perked up through the stem, the movable element must also be raised off its seat to replenish the liquid in the pump chamber. This action causes chatter or noise. It also makes the pump inefficient. This is because as pressure is being created in the pump chamber to perk the liquid, the movable element is also being raised to replenish the perked liquid. This causes a loss in generated pump pressure. A loss in generated pressure decreases the pump efficiency and the result is a longer coffee making period. The time required for making coffee is also increased in some prior art forms of coffee percolators by utilizing an inefficient pump chamber shape and an inadequate concentration and transfer of heat to the liquid in the pump chamber.

A further disadvantage or limitation of some prior art forms of electric coffee percolators, and electric cooking vessels as well, is that they cannot be safely immersed in water for washing or the like. This is because the enclosures for their electrical components may not be water-tight in the first instance, or if they are they are not permanently so.

A still further disadvantage of prior art electric cooking vessels is that they are high cost since they employ a relatively large number of parts, and they also are not easily assembled.

It is an object of this invention to provide an improved food cooking vessel which will overcome the above-discussed disadvantages.

It is a further object of this invention to provide an improved pump for coffee percolators.

It is a further object of the invention to provide an improved pump chamber and heating means for electric coffee percolators.

It is a further object of this invention to provide a coffee percolator which is quiet and rapid.

It is a further object of this invention to provide an improved sealing means for the electrical components of electric cooking vessels.

It is a further object of this invention to provide a fully immersible electric cooking vessel which remains so after many years of use.

It is a further object of this invention to provide an electric cooking vessel which is low cost, uncomplicated and easily assembled.

It is a further object of this invention to provide an electric cooking vessel which is foolproof in operation.

Broadly, the invention as applied to coffee percolators comprises a sealed pump chamber having no moving parts except for a novel inlet valve so that the pump is more quiet and efficient than prior art coffee percolator pumps. The invention also resides in an improved inlet valve for coffee percolator pumps; and also in an improved pump chamber shape and heating element therefor so that perking starts almost instantaneously with energization of the heating element.

The invention further comprises an improved closure means for the electrical components of an electric cooking vessel so as to provide full and permanent water immersibility of the cooking vessel for washing and the like. In this aspect of the invention, stored energy means is utilized to provide a follow-up action on sealed joints of the closure means so that there is no relaxation in the joints and loss of watertightness.

A further aspect of the invention resides in an uncomplicated, low cost and easily assembled arrangement of the electrical components of an electric cooking vessel. This is in part accomplished by providing several functions for a single component, as contrasted with having a separate element for each function. For instance, in the preferred form of the invention, a thermally conductive lug is used to support and give a bimetallic element its proper thermal response for actuating a switch. The lug is also used as a support for the switch, and also for a signal indicator and electrical terminal means for the electrical circuit. In the preferred form of the invention, a main heating element for cooking the food is provided and also a keep-warm heating element for keeping the food warm after it is done. The keep-warm element performs the additional function of retaining the switch open after the food is done so that the food is not recooked. This multipurpose keep-warm heating element is also attached to the previously mentioned multipurpose lug.

This multipurpose concept is also used in the immersibility feature of the invention. For instance, in the preferred form of the invention, a mounting bracket is provided for connecting the closure means for the electrical components to the vessel. This same mounting bracket also performs the function of properly positioning the closure means on the vessel during assembly thereof, and additionally contributes to the support of the keep-warm heating element. Furthermore, the connector means for connecting the closure means to the mounting bracket provides the stored energy means for keeping the closure means joints watertight. In the preferred form of the invention, this is accomplished by mounting a resilient connector receiver on the mounting bracket. When the closure means connector is received by the resilient connector receiver, it is stressed to provide stored energy means for keeping the joints watertight.

Foolproofness is provided in the invention by having the keep-warm heating element keep the main heating element switch contacts open after the food is done, as above described, and also by properly locating the multipurpose lug with respect to the main heating element, the main body of liquid in the coffee urn, and the percolator pump. In the preferred form of the invention the pump chamber is in part defined by a pump well or depression formed in the coffee urn bottom. The multipurpose lug is connected to the coffee urn bottom so that if the urn is empty the bimetallic element and the lug will immediately respond to the main heating element to interrupt its circuit. However, if the coffee urn is filled with water, the lug is so located that the response of the bimetallic element will be controlled by the temperature of the main body of liquid and not by the main heating element or the temperature of the water in the pump. Thus, the switch for the main heater is opened only when the coffee urn is empty or when all the water therein is brewed into liquid coffee. As a further feature of the invention, the previously-mentioned signal means is arranged to go on when the circuit is energized and to go off when the coffee is done. This sequence of operation of the signal means is advantageous since if it does not go on when the coffee urn is filled with cold tap water and plugged in to make coffee, one immediately knows that there is a defect in the electrical controls, components or circuit of the coffee percolator.

The features of the invention which are believed to be novel are set forth with particularity in the appended claims. The invention itself, however, both as to its organization and operation, together with further objects and advantages thereof, may best be understood by reference to the following description taken in connection with the accompanying drawings in which:

FIG. 1 is a side elevational view of an improved coffee percolator constructed in accordance with the invention;

FIG. 2 is a section view, in enlarged scale, taken along the sectional line 2—2 of FIG. 1;

FIG. 3 is a sectional view, in enlarged scale, taken along the sectional line 3—3 of FIG. 2;

FIG. 4 is a sectional view, in enlarged scale, taken along the sectional line 4—4 of FIG. 2;

FIG. 5 is a sectional view taken along the sectional line 5—5 of FIG. 2;

FIG. 9 is a sectional view, in enlarged scale, taken along the section line 9—9 of FIG. 6;

FIG. 10 is a section view taken along the section line 10—10 of FIG. 7; and

FIG. 11 is a diagrammatic illustration of the electrical circuit of the improved coffee percolator.

Figure 6:
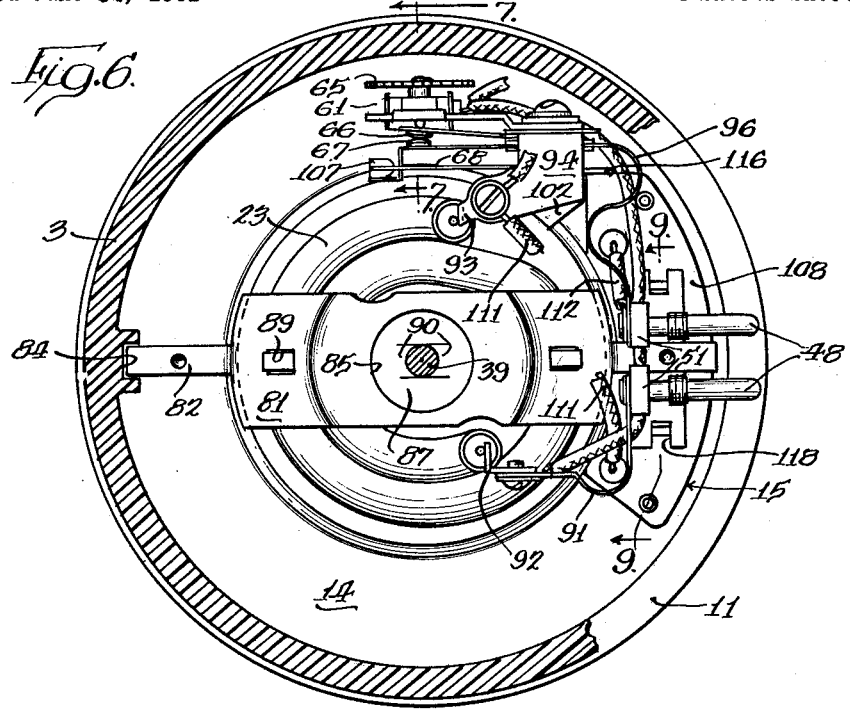
FIG. 6 is a sectional view taken along the section line 6—6 of FIG. 5.

Referring now first to FIG. 1 of the drawings, illustrated therein is an automatic electric coffee percolator comprising a coffee urn or container 1 which is closed at the upper end thereof by a closure cap 2, and has at the lower end thereof a base member 3. As will be disclosed hereinafter in greater detail, the base member 3 is a closure or housing means for the electrical components of the electric coffe percolator and it is watertight so that the coffee percolator can be fully immersed in water for washing and the like. The container 1 has a pouring spout 4 and a handle 5. The handle 5 is preferably constructed from a plastic material which has high heat insulating characteristics. The closure cap 2 has a glass or other translucent material knob 6 which is positioned in an apertured central portion thereof as shown in FIG. 5. As will be described in greater detail hereinafter the lower end of the knob 6 abuts a perforated cover 7 of a perforated coffee basket 8 to apply pressure to a sealing gasket 9 of a percolator pump indicated generally by reference numeral 10.

The outer peripheral portion of the bottom of container 1 has a first step formed therein to provide a seating surface 11 for the upper open end of housing 3. The surface 11 has an annular gasket 12 compressed between itself and the upper rim of housing 3 to provide a watertight joint therebetween. The gasket 12 is seated in a groove 13 formed in the upper rim of the housing 3 which is generally cup-shaped.

Inside the first stepped portion 11, a second stepped portion 14 is formed in the bottom of container 1. The stepped portions 11 and 14 extend circularly around the container bottom. The stepped portion 14 has a low wattage keep-warm heating element 15 pressed thereagainst.

The remainder of the container bottom has a depressed portion formed therein to define a shallow thin-walled pump well 16. The pump 10 comprises the pump well 16, a disk or closure member 17, the gasket 9 which is disposed between the outer peripheries of the disk 17 and the well 16, a stem 18 which is connected to an apertured central portion of the disk 17 and a one-way check valve 19 mounted in the disk 17. The stem 18 is hollow and extends perpendicularly from the general plane of disk 17 up into the knob 6 which is hollow. The stem 18 provides an outlet opening or connection from the percolator pump 10 to the coffee basket 8. Referring also to FIG. 3, the one-way check valve 19 is mounted in an aperture 20 formed in the disk 17 between the gasket 9 and the stem 18. The outer peripheral portion of the disk 17 has a circularly extending channel 21 formed therein in which the gasket 9 is held in assembled position. The movable valve element 19 and the aperture 20 together provide a valved inlet opening for replenishing liquid pumped out of the pump 10 and through the stem 18 into the basket 8. However, as will be described hereinafer, this is accomplished without movment of the disk 17 with respect to the pump well 16. That is to say, the pump chamber 22 defined between the elements 16 and 17 is continuously sealed closed by the gasket 9. Since the parts 16 and 17 do not move with respect to each other, there is no noise or chatter created by these parts as is true of the elements which correspond thereto in some prior art coffee percolator pumps. Additionally, since these two parts are continuously sealed closed with respect to each other, there is no loss of generated pressure as is experienced in prior art coffee percolator pumps.

The configuration or shape of the pump chamber 22 is intentionally made very shallow. That is to say, the depth of the pump chamber 22 is very small and its width is much larger than its depth. This means that there is a comparatively thin layer or mass of water within the pump chamber 22 above the thin-walled member 16 and the member 16 provides a comparatively large heating surface for the concentration of a large quantity of heat thereon and transfer of the same to the liquid within the pump. Accordingly, when the heating element for the pump is energized, percolation is almost instantaneous, even though the container 1 is filled with cold tap water. High concentration of heat on the surface 16 is provided by a heating element 23 which is intimately connected to the underside of surface 16 by brazing or the like.

The heating element 23 is the main or high wattage heater of the coffee percolator. That is to say, it brews the coffee whereas the heating element 15 merely keeps the coffee warm after it is done. The heating element 23 is conventional in the art and comprises an internal resistance wire 24 positioned within an outer metallic sheath 25. The resistance wire 24 is spaced from the sheath 25 by an electrical insulating material 26 which is a relatively good conductor of heat. Referring also to FIG. 6, the heating element 23 is preferably wound on itself into a flat spiral of about 1½ turns and it is positioned against the underside of the pump well 16. The cross section of the sheathed heating element is preferably flattened somewhat, as best illustrated in FIG. 5, so that the individual turns have planar contact with the pump well 16 as contrasted to line contact which would be true if the cross sections of the turns were circular. The above-described geometry or shape of the pump and the main heating element and their disposition with respect to each other provide a very high concentration of heat at the pump well as well as a very rapid transfer of heat from the heating element 23 to the liquid within the pump chamber 22. Therefore, percolation of the water in container 1 is practically instantaneous and very rapid so that the coffee is brewed in a much shorter period of time than attainable with prior art coffee percolators. Making the heater spiral shaped and its turns flat on the side which contacts the pump well means that a major portion of the pump well can have surface contact with the heater.

The one-way movable valve element 19 has a flat bottom portion 27 which is dimensioned so as to close aperture 20 when the valve element is in its raised position. A plurality of posts 28 are formed on the upper surface of the portion 27 adjacent the periphery thereof. These posts pass through the aperture 20 and their upper ends are enlarged or have lugs 29 formed thereon to retain the valve element mounted in the aperture 20. The valve element 19 in accordance with the preferred form of the invention is a single piece molded plastic member. Additionally, the posts 28 have a limited amount of flexibility so that the lugs or protuberances 29 can be snapped into the aperture 20 for quick mounting of the valve element 19 in the aperture 20. Accordingly, the valved inlet opening for the pump essentially consists only of two parts, the aperture 20 and the element 19. The element 19, of course, is very quiet in its movement.

The means for continuously urging the disk 17 against the pump well 16 so as to compress the gasket 9 to retain the pump chamber 22 sealed closed will now be described. The perforated coffee grain basket 8 is fixed at its bottom to the hollow stem 18. A fixed connection effects a further noise reduction over that achieved by the prior art. In the prior art, the coffee basket 8 was loosely mounted on the stem 18 whereby these parts could jiggle or chatter with respect to each other. The cover 7 for the basket 8 has a central aperture formed therein and connected to this central aperture is a short tubular member 30 which receives the spaced upper end of the stem 18. The upper end of the short tubular member 30 has a flange 31 formed thereon. A spring 32 is disposed within the space between the tubular member 30 and stem 18. The upper end of the spring abuts up against the flange 31 and the upper turn thereof is enlarged somewhat so that the spring will be self-retaining within the tubular member 30. A circular protuberance or bead 33 is formed on the stem 18 slightly below the flange 31 and this protuberance forms a stop for the lower end of spring 32. When the cover 2 is in closed position, the lower end of knob 6 bears down on basket cover 7. This causes spring 32 to be compressed between the flange 31 and the stop 33. This results in a downward force on the stem 18 so that the gasket 9 is retained in a state of compression to seal the pump chamber 22 closed. The gasket 9, besides providing a perfect seal along the edges of the pump chamber 22 to prevent loss of pump pressure, also contributes to a reduction in noise inasmuch as it cushions the parts 16 and 17 with respect to each other.

The hollow stem 18 extends slightly above the end flange 31 into the hollow knob 6. The percolated water coming out of the upper stem 18 falls down on the perforated basket cover 7 and then filters through the coffee grains in the perforated coffee grain basket 8. This process is repeated until all of the water in container 1 has been converted into liquid coffee. When this occurs the body of liquid in the coffee percolator will have attained a predetermined temperature whereby the thermal switch hereinafter described will open to de-energize the main heater 23 and thereafter the coffee will be kept warm by the secondary heater 15. The knob 6 is immovably connected by appropriate means, as will be obvious to those skilled in the art, to the coffee urn cap or cover 2 so that it can perform its function of bearing down on the basket cover 7 to retain the gasket 9 compressed. The container cap or cover 2 is kept from popping off the container due to the back pressure of the spring 32 by a plurality of pips 34 or the like formed on a downwardly extending cylindrical skirt 35 of cover 2. The upper open rim of container 1 has an inturned flange 36 formed thereon. A plurality of depressions 37 are formed on the internal flange 36 to permit the cap 2 to be inserted in the open end of the container 1. When the pips 34 are aligned with the depressions 37, the cap 2 can be pushed down to closed position and then after it is rotated slightly, the internal flange 36 and pips 34 will retain the cap 2 in closed position.

Referring to FIG. 5, the base member 3 will now be described. Preferably the member 3 is formed by a molding or casting operation from a plastic material which has electrical and heat insulating characteristics. Member 3 is generally cup-shaped and serves as a housing or casing means for the electrical components of the percolator, and also serves as a spacer for the coffee urn so that it can be rested on a table top or the like without damage to the same. The bottom of member 3 has a plurality of rubber or the like cushion pad means 38 connected thereto so that the table top will not be scratched. The member 3 is removed from the coffee urn merely by loosening a bolt, screw or other appropriate connector 39 and a pair of electrical terminal nuts or the like 40. When the three elements 39 and 40 are disconnected and the member 3 is removed from the coffee urn bottom, the electrical components, controls and circuitry mounted on the container bottom are intact. The connector element 39 passes through an aperture 41 formed in the center of the bottom of member 3. This aperture is sealed closed by a gasket 42 disposed within a counterbore 43 which is concentric with the opening 41. The gasket 42 is compressed between the base of the counterbore and a head, washer or the like 44 on the outer end of the connector 39.

Integrally formed on one side of the member 3 is a terminal box 45 or the like. An external opening 46 to the terminal box provides a guide opening for a not shown plug-in connector which is to be engaged with a pair of electrical terminals 48 which are disposed in the terminal box 45. The terminals 48 extend through a pair of openings 49 formed in the rear wall of the box 45. These openings are sealed closed by a pair of gaskets 50 which are disposed about the inner ends of the terminals 48. The inner ends of terminals 48 have flanges 51 formed thereon and formed in the flanges 51 concentric with the terminals 48 are grooves 52. These grooves 52 receive the gaskets 50 and gaskets 50 are compressed between flanges 51 and the inner surface of the rear wall of terminal box 45. Pressure is applied to the gaskets 50 by the terminal nuts 40. A pair of cover plates 53 can be used between the nuts 40 and the openings 49.

Figure 7:
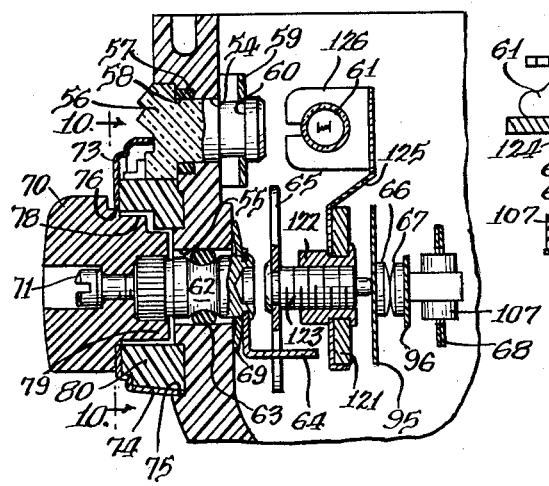
FIG. 7 is a sectional view, in enlarged scale, taken along the section line 7—7 of FIG. 6.

As shown in FIG. 7, disposed on a side of member 3 about 90 degrees from the terminals 48 are a pair of apertures 54 and 55 which are sealed closed. The aperture 54 is for the purpose of providing an externally visible signal to indicate when the coffee is done, and the aperture 55 is for the purpose of receiving an external manually operable actuator for setting the strength of the coffee desired. The aperture 54 has a glass or other translucent material plug 56 mounted therein. The aperture 54 is sealed closed by a gasket 57 which is compressed by an end flange 58 formed on member 56. The flange 58 is urged against gasket 57 to compress the same by a snap lock washer 59 or the like on the inner end of member 56. The element 59 locks the member 56 in its assembled position and urges member 56 inwardly to compress gasket 57 by snapping into a groove 60 formed on the inner end of member 56. The translucent plug 56 is illuminated by a signal lamp 61 which is positioned inside the member 3 adjacent member 56.

The coffee brew selector comprises a rotatable element 62 disposed within the aperture 55. Aperture 55 is sealed closed by a gasket 63 which is disposed within aperture 55 about rotatable member 62. When the member 62 is inserted in aperture 55, the gasket 63 is compressed. The inner end of the rotatable member 62 has a bent finger or arm 64 connected thereto which will engage a petal shaped member 65 disposed within member 3. When member 62 is rotated interengagement of parts 64 and 65 causes a pair of switch contacts 66 and 67 to be moved jointly with respect to a bimetallic element 68 so that a greater or lesser degree of movement of the bimetallic element 68 is required to open the contacts 66 and 67 (see also FIG.

8). A spring washer 69 is mounted on the inner end of member 62 adjacent to the finger 64 and the outer end of member 62 has a control knob 70 fastened thereto such as by a stud 71. The knob 70 and the outer end of member 62 have interengaging serrated surfaces so that rotation of the knob 70 causes rotation of the member 62. The member 62 is retained in its illustrated assembled position so as to keep the opening 55 sealed closed by gasket 63 by the washer 69 and the knob 70.

The knob 70 has an indicator mark or the like 72 (see FIG. 1) which cooperates with a coffee brew selector dial 73. The dial 73 is a thin metallic stamped part which has a peripheral flange 74 formed thereabout. The peripheral flange 74 snaps into a groove 75 formed in the side of member 3 about the knob 70. In this way, the dial 74 is correctly located with respect to knob 70. Dial 73 is retained in assembled position by its snap-in relationship with respect to groove 75 as well as its disposition between the side of member 3 and the fastened knob 70. An aperture 76 in the dial plate 73 for the knob 70 has a pair of oppositely disposed ledges or shoulders 77 formed thereon, see FIG. 10. A lug 78 formed on the hub 79 of knob 70 cooperates with these shoulders or ledges 77 to limit the movement of knob 70 through the coffee brew selector range. If a different selector range is desired, it will be obvious to those skilled in the art that this can be accomplished by removing the knob 70 and adjusting the rotatable element 62. Since the dial 73 is a rather thin metallic part, it can be strengthened by fitting a solid backing member 80 therein which will have an aperture and ledges or shoulders formed therein which will register with the aperture 76 and ledges or shoulders 77 of dial 73. The backing member 80 could also be an integrated part of the housing 3, if feasible from a manufacturing point of view.

The means for connecting the housing 3 to the coffee container 1 and the stored energy means for retaining the gasket 12 under compression so as to seal its joint watertight will now be described in connection with FIGS. 5 and 6. Connected to the bottom of container 1 is a mounting bracket 81. Mounting bracket 81 is generally U-shaped. Its upper ends are connected to opposite sides of the pump well 16 as will be more clear hereinafter. Each of the ends of U-shaped bracket 81 has an outwardly extending finger 82 integrally formed thereon. When the percolator parts are in assembled position, one of the fingers 82 is disposed above the terminal box 45 and contributes to the support of the secondary heating element 15. It does this through the medium of a resilient element 83 positioned between itself and the heater 15 so as to press the heater 15 in intimate thermal contact with the second stepped portion 14. Disposed on the opposite side of member 3 from the terminal box 45 is a guide means comprising a groove 84 formed in the inside of member 3. This groove 84 receives the other or left hand finger 82 so as to properly position the housing member 3 with respect to the container 1.

The U-shaped bracket 81 can be connected to the container bottom at the pump well 16 by brazing or other suitable means. The base portion of U-shaped bracket 81 has an aperture 85 formed therein through which the connector 39 for member 3 extends. The connector 39 is connected to the bracket 81 by being received in a resilient connector receiver 86 which is mounted on bracket 81. The resilient connector receiver 86 in effect is a combination spring and nut. It has a main portion 87 which is constructed similar to the conventional speed nut. Its opposite ends have integral mounting fingers formed thereon so that when viewed from the side the member 86 is generally U-shaped. These fingers 88 are received in notches 89 formed in the legs of the U-shaped bracket 81. The main portion 87 of member 86 rests on the base portion of bracket 81 and it is bowed somewhat similar to a leaf spring. The central portion of the main part of member 86 has a pair of fingers 90 punched or otherwise formed therein which define an aperture therebetween which is in registration with the aperture 85 and which is adapted to threadedly receive the connector 39.

When the connector 39 is received between the fingers 90 and screwed or threaded in an inward direction, the upper open portion of member 3 will be first abutted up against the first stepped portion 11 to compress the gasket 12. Continued turning of the connector 39 will stress the fingers 90 and the leaf-like main portion 87. Stressing of the parts 87 and 90 will serve to lock the connector 39 against loosening. Additionally, stressing of parts 87 and 90 serves to provide a stored energy means to continuously urge the housing 3 against the first stepped portion 11 so that the gasketed joint therealong will at all times be retained in a watertight condition. That is to say, there will be no relaxation of this gasketed watertight joint. The same is true for the watertight joint at the gasket 42 for the aperture 41. The stored energy means is a spring follow-up mechanism for retaining these two sealed joints in a watertight condition and, additionally, the spring follow-up mechanism also serves as a fastening means for connecting the base or housing 3 to the bottom of container 1. Other types of stored energy means or spring follow-up means could be employed. However, the type illustrated in the drawings is advantageous inasmuch as it performs a dual function and is relatively uncomplicated, easily assembled, and low cost. Additionally, it readily provides the relatively high force which is required to obtain a high sealing pressure at the gasketed joints.

Figure 8:
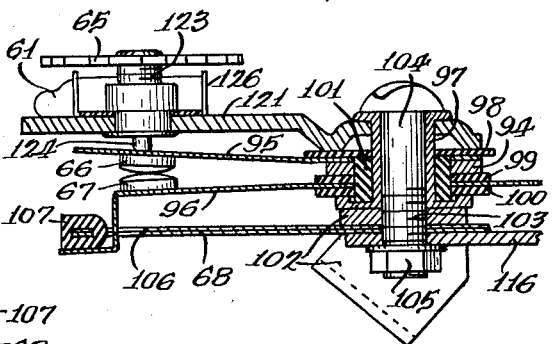
FIG. 8 is a broken away view, in enlarged scale, of the switch assembly illustrated in the upper part of FIG. 6.

The electrical switch for the high wattage heating element 23 will now be described by reference to FIGS. 6 to 8. When the coffee percolator is plugged in, current will flow from one of the terminals 48 through a resilient strap or bus bar 91 connected thereto to a terminal 92 which is connected to one end of the heating element 23. The terminal 92 can be connected to the end of heating element 23 by brazing or the like, and the resilient bus bar 91 is connected to the terminal 92. Bus bar 91 is constructed from resilient material so that the terminal 48 can be guided into its opening 49 in the terminal box 45. From terminal 92, current flows through the heater for 1½ turns to a terminal 93 which is connected to the opposite end of heater 23. Then the current will flow through a conducting bracket 94 to a resilient finger or contact arm 95 which has the contact 66 mounted on the outer end thereof. From contact 66 current goes through contact 67 which is mounted on the outer end of a combined resilient finger and strap or bus bar 96. The outer or bus bar part of member 96 has the other terminal 48 mounted thereon. The part of element 96 which carries the contact 67 is a resilient contact arm and the part of element 96 which carries the other terminal 48 is a resilient bus bar or connecting strap. The contact arm and bus bar portions of element 96 are integral extensions of each other. The bus bar part of element 96 is made resilient for similar reasons as noted in connection with bus bar or strap 91.

The elements 94, 95 and 96 are connected together by a sleeve 97 whose opposite ends are peened over to retain these elements in aligned condition. The elements 94 and 95 are in electrical contact with each other and these two element are insulated from the element 96 by insulating material washers 98, 99 and 100 and electrical insulating collar 101.

The electrical switch comprising the contact arms 95 and 96 are mounted on a thermally conductive lug 102 which is generally Z-shaped and connected to the bottom of container 1 at one of its ends. Thus, the lug 102 provides a mounting means for the electrical switch as well as one of the terminals 48 of the electrical terminal means of the coffee percolator. As will be described hereinafter in greater detail, the mounting lug 102 also supports the signal means 61, the bimetallic element 68, the temperature adjusting means 65, and the keep-warm heating element 15. The thermal lug 102 is connected to the bottom of container 1 by brazing or the like at the peripheral rim or side wall portion of the well 16 radially outward of gasket 9. This means that when the container 1 is filled with liquid, the temperature of the thermal lug 102 will be controlled by the main body of liquid within the container 1 and not by the temperature of the liquid inside the pump chamber 22. This is because the point of connection between the thermal lug 102 and the pump well is not along one of the surfaces which immediately defines the pump chamber 22 but slightly removed therefrom. For the same reason, the temperature of the thermal lug 102 will reflect the temperature of the main body of liquid in container 1 rather than the temperature of the heating element 23. However, if the container 1 is empty, the thermal lug 102 is positioned close enough to the heating element 23 so that it will rapidly respond thereto to cause the switch to open.

The thermal lug 102 has an aperture 103 formed therein which along with the collar or sleeve 97 receives a suitable fastening means such as a bolt 104 and nut 105 to securely mount the switch on the thermal lug. The bimetallic element 68 is mounted on the side of lug 102 which is opposite from the side of lug 102 on which the switch arms are mounted, see FIG. 8. Bimetallic element 68 has a notch 106 formed on the outer end thereof. A finger formed on the outer end of the switch arm 96 extends through this slot 106 and is adapted to be engaged by an insulating button 107 on the outer extremity of bimetallic element 68. When the coffee is done, or in the event the coffee urn should be empty, the bimetallic element 68 will move away from contact 66 and carry contact 67 away from contact 66 to, in effect, de-energize the main heating element 23. When the coffee is done and the contacts 66 and 67 are opened, the coffee will not cool down and the contacts reclose due to the keep-warm heating element 15. That is to say, heating element 15 is a low wattage heating element which is sufficient to make up for the loss of heat from the coffee by convection and radiation. Also, the bimetallic element 68 will not cool down so as to permit the contacts 66 and 67 to reclose, which would result in repercolation, inasmuch as the heating element 15 also serves the function of keeping contacts 66 and 67 open after the coffee is done. This is also true if the vessel is empty. That is, if the vessel is empty, the secondary heater 15 will keep contacts 66 and 67 open. This is accomplished by mounting a thermally conductive strap 108 of the heating element 15 on the thermal lug 102 in contact with the bimetallic element 68. Referring also to FIGS. 9 and 11, the keep-warm heating element 15 comprises a high resistance wire 109 wound into a plurality of spaced turns on a mica-element 110. The heater wire 109 is connected in series with the main heating element 23 and in shunt with the shunt contacts 66 and 67 for the heating element 15 by being connected to the terminal 93 by a wire connector 111 and to the terminal 48 which is carried by the bus bar 96 by a wire connector 112. When the contacts 66 and 67 are closed, they provide a shunt path around the high resistance wire 109 so that the heater 23 draws high current whereas heater 15 draws negligible current so that, in effect, heater 15 is off and the heater 23 is on. When the contacts 66 and 67 are opened, then the heater 23 is connected solely in series with heater 15 and draws low current which, in effect, means that heater 23 is de-energized whereas heater 15 is now energized. Of the total heat generated by heaters 23 and 15 at this time, the greater part is generated by heater 15 since, though both heaters draw the same current, heater 15 has the higher resistance. Therefore, heater 15 is termed the keep-warm heater.

The mica-board 110 is positioned between two mica spacers 113 and 114. The mica-boards 110, 113 and 114 are positioned against the strap 108 and riveted thereto by rivets 115 or the like. The heating element 15 heats the bottom of container 1 to keep the coffee warm and simultaneously heats the strap 108 from which heat is transferred by an integral arm 116 of strap 108 to the bimetallic element 68. The arm 116 is positioned against the bimetallic element 68 on the mounting lug 102.

When the coffee pot is filled with fresh water and energized to make coffee, the heater 15 will not cause the contacts 66, 67 to trip open since at this time it, in effect, is off inasmuch as it draws negligible current since it is shunted by the closed contacts 66, 67. Also, at this time heat generated by the heater 23 is being carried away by the liquid being percolated in the percolator pump so that the heat lug 102 remains relatively cool. However, when the coffee is done, the liquid in the coffee pot is at a higher temperature so that the lug 102 becomes warmer because of this increase in temperature and the delivery of a larger proportion of the heat of heater 23 to the lug 102 through the bottom of the vessel rather than to the liquid. Therefore, the lug 102 will now have caused the bimetallic element to have deflected sufficiently to trip the contacts 66, 67 open. Opening of contacts 66, 67 will, in effect, turn the heater 23 off and the heater 15 on, and the heater 15 will now keep the opened contacts 66, 67 open by heat conduction through the integral portion 116 of strap 108.

The heater 15 is urged into contact with the stepped portion 14 of the container bottom by spring element 33 which is positioned between strap 108 and the finger 82 of support bracket 81 which is disposed above the terminal box 45. The spring 83 is a leaf-like spring which has an aperture 117 formed in its central portion and a notch 118 at each end thereof, see FIG. 6. The notches 118 receive tabs 119 which are punched out or otherwise formed on the member 108 and the aperture 117 receives a pip or the like 120 formed on the finger 82, and, in this manner, the spring 83 is retained in position and the heating element 15 is urged into intimate thermal relationship with the second stepped portion 14 of the container bottom.

The means for adjusting the temperature trip range of the thermal switch will now be described. The adjusting means is mounted on the thermal lug 102 by a mounting arm 121. Arm 121 comprises part of the switch unit assembly inasmuch as it is connected to the peened over collar 97 along with the switch elements. The outer end of the arm 121 has a threaded sleeve 122 connected thereto which is adapted to receive a threaded adjusting element 123. The inner end of adjusting member 123 has an insulating button or the like 124 connected thereto and is adapted to engage the contact arm 95 behind the contact 66. The outer end of the adjusting member 123 has the petal-shaped wheel 65 connected thereto which is adapted to be engaged by the arm 64 which is manipulated by the knob 70. Depending upon the direction of movement of adjusting member 123, the contacts 66 and 67 are caused to move together so as to move the finger on the end of the arm 96 towards or away from the insulating button 107 on the outer end of the bimetallic element 68. As the finger on the end of contact arm 96 is moved away from the insulating element 107, the temperature range is raised, whereas as the finger is moved towards the insulating element 107, the temperature range is lowered.

The signal means 61 is also mounted on the lug 102. This is accomplished by connecting a lamp holder 125 to the mounting arm 121 between the outer end of the arm and the threaded sleeve 122. The upper end of the lamp holder 125 has a pair of apertured ears 126 which are adapted to receive the signal means 61 which, in the instant case, is a neon bulb. The neon lamp 61 is connected in shunt with the main heater 23 at the terminals 92 and 93 by terminal wires 128 and 129, respectively. A high resistance element 130 is connected in the terminal wire 129 between the neon bulb 61 and terminal 93 as a protector for the neon bulb 61.

When the shunt contacts 66 and 67 are closed, the heater 23 is drawing high current which means that most of the voltage which is provided by the electrical energy source to which the percolator is connected occurs as a voltage drop across the high wattage heating element 23. The relatively high voltage drop is sufficient to cause the neon bulb 61 to be illuminated and, in turn, to cause the lens 56 to glow. However, when the shunt contacts 66 and 67 are opened, a relatively higher proportion of the total voltage drop occurs across the heating element 15 which means that there is insufficient voltage drop across the heating element 23 to cause the neon bulb 61 to be illuminated. As heretofore noted, having the neon bulb 61 go on the instant the filled coffee percolator is plugged in has the advantage in that if it does not go on, then one is apprised of the fact that there may be a fault in the electric percolator or the electrical energy source.

In one form of the invention, the high wattage heater 23 had a rating of 1000 watts and the low wattage heater had a rating of 40 watts. Such a coffee percolator brewed coffee in about one-half the time required by other coffee percolators currently available on the commercial market. The reasons for this are several. For instance, a high wattage heater is utilized in the invention and the heat generated by the heater is efficiently transferred to the percolator pump by the improved shape of the heater and pump well and their disposition with respect to each other. Additionally, the improved percolator pump is more efficient in that there is practically no loss of pressure so that no liquid heated in the pump escapes from the pump to by-pass the coffee grains. Thus, the liquid is efficiently heated and circulated through the coffee grains to brew the coffee quickly. That is to say, in the invention the fresh liquid in the pump is heated very rapidly to bring it to a high temperature to start percolating the liquid almost instantaneously. Since there is no loss of liquid in the pump, all the liquid which is heated in the pump is delivered to the coffee grains in the coffee basket. Since the percolation is instantaneous and all the high temperature liquid in the pump is delivered to the coffee grains, the time required for brewing coffee is materially reduced over that required by prior art coffee percolators.

While there has been shown and described a particular embodiment of the invention, it will be obvious to those skilled in the art that changes and modifications may be made without departing from the invention, and that it is intended by the appended claims to cover all such changes and modifications as fall within the true spirit and scope of the invention.

What is claimed as new and desired to be secured by Letters Patent of the United States is:

1. In a coffee percolator comprising a container, means for heating the bottom of said container, a liquid permeable coffee grain holder in the top of said container, and a pump for circulating liquid from the bottom of said container into said holder, said pump comprising a hollow stem, a disk connected to the bottom of said stem, said disk and container bottom being positioned with respect to each other to define a pump chamber therebetween, said stem communicating with said chamber and with said holder, means continuously urging said disk against said container bottom to keep said chamber sealed closed, said stem comprising an exit opening for said chamber, and a valved inlet opening formed in said disk, said valved inlet opening comprising an aperture formed in said disk, and a movable one-way valve element mounted in said aperture, the bottom of said container opposite to said disk being thin walled and having said heating means connected thereto, said pump chamber having a depth which is relatively small compared to its width to provide a shallow pump chamber, and said valve element comprising a single-piece molded plastic member, said member being snap-mounted in said aperture, and said valved inlet opening consisting solely of said aperture and said member.

2. In a coffee percolator as in claim 1, wherein said single-piece plastic member has a plastic disk which closes said aperture, a plurality of integral spaced posts formed on one side of said plastic disk which extend through said aperture, integral lugs formed on the ends of said posts to retain said valve element mounted in said aperture, and said posts having limited flexibility for snap-mounting of said valve element in said aperture.

3. In a coffee percolator as in claim 1, wherein said coffee grain holder comprises a perforated basket which is supported in the top of said container by being immovably mounted on said stem, said container being open at the upper end thereof, a removable closure cap for the open upper end of said container, and said means continuously urging said disk against the container bottom comprising said closure cap and a resilient element which is compressed when said container is closed by said cap, and an annular sealing gasket disposed between said disk and container bottom to seal said pump chamber closed.

4. In a coffee percolator as in claim 3, wherein said resilient element comprises a coiled spring, a movable perforated cover for said basket, said stem extending through the bottom of said basket, said coiled spring, and said cover, said stem having a stop formed thereon for the bottom of said coiled spring, and said movable cover compressing said spring against said stop when said cap is in closed position to continuously resiliently urge said disk against the bottom of said container to seal said pump chamber closed.

5. In a coffee percolator as in claim 1, wherein the thin-walled bottom of said container has an integral pump well formed therein, said disk being positioned in said well and defining therewith said pump chamber, and a compressible sealing member disposed between said disk and said pump well for cooperating with said means continuously urging said disk against said container bottom to keep said chamber sealed closed.

6. In a coffee percolator comprising a container, means for heating the bottom of said container, a liquid permeable coffee grain holder in the top of said container, and a pump for circulating liquid from the bottom of said container into said holder, said pump comprising a hollow stem, a disk connected to the bottom of said stem, said disk and container bottom being positioned with respect to each other to define a pump chamber therebetween, said stem communicating with said chamber and with said holder, means continuously urging said disk against said container bottom to keep said chamber sealed closed, said stem comprising an exit opening for said chamber, and a valved inlet opening formed in said disk, said valved inlet opening comprising an aperture formed in said disk, and a movable one-way valve element mounted in said aperture, the bottom of said container opposite to said disk being thin-walled and having said heating means connected thereto, said pump chamber having a depth which is relatively small compared to its width to provide a shallow pump chamber, the thin-walled bottom of said container having an integral pump well formed therein, said disk being positioned in said well and defining therewith said pump chamber, and a compressible sealing member disposed between said disk and said pump well for cooperating with said means continuously urging said disk against said container bottom to keep said chamber sealed closed, said pump well comprising an integral depressed portion of said container bottom, said disk comprising a substantially flat member, a circumferentially extending channel formed in the underside of said flat member, said compressible sealing member comprising an annular sealing gasket positioned in said channel, and said aperture being formed in said flat member between the central portion thereof and said channel.

7. In an electric cooking vessel, said vessel having automatic control means mounted thereon for automatic controlled heating of said vessel, watertight closure means for said control means for full liquid immersibility of said vessel and its automatic control means for washing, said closure means comprising a casing surrounding said control means, said casing having a gasketed joint for a removable part thereof and stored energy means for retaining said gasketed joint under compression, said stored energy means comprising a resilient connector receiver and a connector for said removable part, said connector receiver being stressed by said connector to provide said stored energy means.

8. A fully immersible electric cooking vessel, comprising, an electric heating element positioned against the underside of the bottom of said vessel, a thermally responsive switch mounted on the underside of said vessel, and watertight closure means for said heating element, switch and underside whereby said vessel can be fully immersed in water for cleaning and the like, said closure means comprising a generally cup-shaped member, said member being butted up against said underside at its open end, compressible sealing means between said open end and underside, and stored energy means continuously urging said open end against said underside to continuously compress said sealing means.

9. A fully immersible electric cooking vessel, comprising, an electric heating element positioned against the underside of the bottom of said vessel, a thermally responsive switch mounted on the underside of said vessel, and watertight closure means for said heating element, switch and underside whereby said vessel can be fully immersed in water for cleaning and the like, said closure means comprising a generally cup-shaped member, said member being butted up against said underside at its open end, compressible sealing means between said open end and underside, and stored energy means continuously urging said open end against said underside to continuously compress said sealing means, said stored energy means comprising a combination spring and nut member mounted on said underside, a bolt extending in watertight relationship through said cup-shaped member, said bolt being received in said combination member to connect said cup-shaped member to said underside and simultaneously compress said sealing means and stress said combination member to provide said stored energy means.

10. In an electric cooking vessel as in claim 8, wherein said cup-shaped member comprises a single-piece molded plastic member, the rim of the open end of said cup-shaped member having a groove formed therein, said compressible sealing means comprising a compressible sealing gasket positioned in said groove to provide a watertight joint between said cup-shaped member and the underside of said vessel, and said stored energy means operating to compress said sealing gasket against said underside in the event of relaxation of said watertight joint.

11. A fully immersible electric cooking vessel, comprising, an electric heating element positioned against the underside of the bottom of said vessel, a thermally responsive switch mounted on the underside of said vessel, and watertight closure means for said heating element, switch and underside whereby said vessel can be fully immersed in water for cleaning and the like, said closure means comprising a generally cup-shaped member, said member being butted up against said underside at its open end, compressible sealing means between said open end and underside, and stored energy means continuously urging said open end against said underside to continuously compress said sealing means, said cup-shaped member comprising a single-piece molded plastic member, the rim of the open end of said cup-shaped member having a groove formed therein, said compressible sealing means comprising a compressible sealing gasket positioned in said groove to provide a watertight joint between said cup-shaped member and the underside of said vessel, a support bracket mounted on said underside, a combination spring and nut member mounted on said bracket, a bolt extending in watertight relationship through said cup-shaped member, said bolt being received in said combination member to connect said cup-shaped member to said underside and simultaneously compress said sealing gasket and stress said combination member to provide said stored energy means, and lugs formed on said support bracket and guide means formed inside said cup-shaped member, said lugs being cooperative with said guide means to position said cup-shaped member on said vessel in a predetermined relationship.

12. In an electric cooking vessel, a high and a low wattage heating element mounted on the underside thereof, a thermally responsive switch mounted on said underside, said switch being actuatable by a bimetllic element, a thermally conductive lug intimately connected to said underside, said bimetallic element and switch being supported on said lug, a bracket mounted on said underside, a closure member for enclosing said heating elements, underside, switch, bimetallic element, lug and bracket, said closure member being connected to said vessel by being fastened to said bracket, and said low wattage heating element being mounted on said underside by said bracket.

13. In an electric cooking vessel as in claim 12, wherein said closure member comprises a generally cup-shaped member, a guide member integrally formed on said bracket, guide means formed on the inside of said cup-shaped member, and said guide member cooperating with said guide means to connect said cup-shaped member to said vessel in a predetermined relationship.

14. In an electric cooking vessel, a high and a low wattage heating element mounted on the underside thereof and in intimate thermal relationship therewith, a thermally responsive switch positioned adjacent said underside for controlling said high wattage heating element, said switch being actuated by a bimetallic element, a thermally conductive lug connected to said underside in intimate thermal relationship therewith, said bimetallic element and switch being mounted on said lug, said bimetallic element being in intimate thermal relationship with said lug for actuation of said switch to open position at a predetermined temperature, and thermally conductive means in intimate thermal relationship with said low wattage heating element and bimetallic element to retain said switch in said open position.

15. In an electric cooking vessel as in claim 14, wherein said high wattage heating element comprises a main heating means for the food contents of said vessel and said low wattage heating element comprises a keep-warm heating means for the food contents of said vessel, said thermally conductive means to retain said switch in said open position comprising a supporting member for said low wattage heating element, said supporting member being mounted on said lug and being in contact with said low wattage heating element and said bimetallic element.

16. In an electric cooking vessel as in claim 15, an electric signal indicator for indicating said predetermined temperature, said indicator being mounted on said lug, electrical terminal means for said heating elements, and said electrical terminal means being mounted on said lug.

17. In a coffee percolator, a vessel, a shallow pump well integrally formed in the bottom of said vessel, a closure member for said well, a sealing gasket interposed between said closure member and well, and means urging said closure member toward said pump well to compress said gasket to continuously seal said pump well closed, a liquid in said vessel, an outlet stem and valved inlet on said closure member for circulating said liquid through said pump, said stem extending to above the surface of said liquid, and a heater for operating said pump, said heater comprising a sheathed electric heating element, said sheathed electrical heating element being formed in a flat spiral and being positioned against the underside of said pump well and covering a substantial portion thereof for high heat transfer to the liquid in said pump well.

18. In a coffee percolator as in claim 17, wherein the side of the turns of said sheathed spiral are flat for broad surface contact between said heater and underside, and said heater being connected to said underside by brazing.

19. In a coffee percolator as in claim 18, wherein said heater is controlled by a thermally responsive switch, said switch comprising a pair of contacts and a bimetallic actuator, a thermally conductive lug, said switch being mounted on said lug, and said lug being positioned against the bottom of said vessel away from said pump well so as to be temperature responsive to the temperature of the main body of liquid in said container but close enough to said pump well so as to be temperature responsive to said heater when said vesesl is empty.

20. In a coffee percolator, a vessel, a percolator pump well formed in the bottom of said vessel, a main heater for said percolator pump well for brewing coffee, a keep-warm heater for keeping said brewed coffee warm, said main heater being connected to said pump well and said keep-warm heater being connected to said bottom but away from said pump well, a thermal switch for controlling said heaters, said thermal switch comprising a pair of contacts and a bimetallic element, a lug for supporting said switch, said lug being constructed from thermally conductive material and being connected to the bottom of said vessel sufficiently away from the pump well to cause the bimetallic element to respond to the temperature of the main body of liquid in said container rather than the temperature of said pump well or main heater except when said vessel is empty, and a thermally conductive bracket for supporting said keep-warm heater from said lug and causing the bimetallic element to retain said contacts open when once opened, said switch being operative to open said contacts to place said main heater off and said keep-warm heater on when said coffee is brewed or when said vessel is empty.

21. In a coffee percolator, a vessel, a generally cup-shaped member connected to the bottom of said vessel and defining therewith a chamber, means for sealing the joint between said bottom and the cup-shaped member, a main heater and a keep-warm heater in said chamber, a thermal switch in said chamber for controlling said heaters, a manual adjusting means for said switch extending through said cup-shaped member, the entrance in said cup-shaped member for said manual means being sealed closed, a pair of electrical terminals extending through said cup-shaped member for energizing said heaters, the entrance in said cup-shaped member for said terminals being sealed closed, a mounting bracket in said chamber connected to said vessel, said cup-shaped member being connected to said vessel by a stud extending through said cup-shaped member to said bracket, the entrance for said stud through said cup-shaped member being sealed closed, and a spring follow-up mechanism acting on said stud for retaining said joint and last-mentioned entrance sealed closed.

22. In a coffee percolator as in claim 21, wherein said heaters, switch, terminals and bracket are supported on the bottom of said vessel independently of said cup-shaped member, said manual means being removable as a unit with said cup-shaped member, and said bracket positioning said cup-shaped member with respect to said vessel so as to align the entrance in the same for said terminals with the terminals.

23. In a coffee percolator as in claim 22, wherein a signal lamp is provided, said signal lamp, switch, keep-warm heater and one of said terminals being supported from a lug connected to the bottom of the vessel, the bracket providing additional support for said keep-warm heater, said main heater comprising a sheathed heater brazed to the bottom of the vessel, and the other of said terminals being supported by one terminal end of said sheathed heater.

24. In a coffee percolator as in claim 22, wherein said terminals are secured in their entrances by externally accessible fastening means thereon, said cup-shaped member and manual adjusting means being removable as a unit from said vessel bottom by mere loosening of said fastening means and stud with the other parts of said coffee percolator remaining in assembled position.

References Cited in the file of this patent
UNITED STATES PATENTS

| | | |
|---|---|---|
| 1,032,032 | Staunton | July 9, 1912 |
| 1,257,110 | Pfirman | Feb. 19, 1918 |
| 1,573,668 | Wood | Feb. 16, 1926 |
| 2,175,727 | Graham | Oct. 10, 1939 |
| 2,610,283 | Kolisch | Sept. 9, 1952 |
| 2,651,707 | Jepson | Sept. 8, 1953 |
| 2,744,467 | Bahniuk | May 8, 1956 |
| 2,817,743 | Foster | Dec. 24, 1957 |
| 2,903,552 | Jepson | Sept. 8, 1959 |
| 2,918,878 | Zieg et al. | Dec. 29, 1959 |
| 2,924,698 | Jepson | Feb. 9, 1960 |
| 2,926,595 | Hron | Mar. 1, 1960 |
| 3,022,411 | La Vern | Feb. 20, 1962 |
| 3,022,720 | Malz | Feb. 27, 1962 |